United States Patent
Ueda et al.

(10) Patent No.: US 7,432,004 B2
(45) Date of Patent: Oct. 7, 2008

(54) FUEL CELL ELECTRIC POWER GENERATING SYSTEM AND METHOD OF STOPPING FUEL CELL ELECTRIC POWER GENERATION

(75) Inventors: Tetsuya Ueda, Kasugai (JP); Takeshi Tomizawa, Ikoma (JP); Kunihiro Ukai, Ikoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 554 days.

(21) Appl. No.: 10/130,468
(22) PCT Filed: Jun. 12, 2001
(86) PCT No.: PCT/JP01/04960

§ 371 (c)(1),
(2), (4) Date: Sep. 27, 2002

(87) PCT Pub. No.: WO01/97312

PCT Pub. Date: Dec. 20, 2001

(65) Prior Publication Data

US 2003/0054212 A1 Mar. 20, 2003

(30) Foreign Application Priority Data

Jun. 14, 2000 (JP) ............................. 2000-177938

(51) Int. Cl.
*H01M 8/04* (2006.01)
(52) U.S. Cl. .......................... 429/19; 429/17
(58) Field of Classification Search .................. 429/12, 429/13, 20, 24, 22, 26, 17
See application file for complete search history.

(56) References Cited

U.S. PATENT DOCUMENTS 4,046,956 A * 9/1977 Fanciullo ..................... 429/20

(Continued)

FOREIGN PATENT DOCUMENTS

JP 61-88461 5/1986

(Continued)

OTHER PUBLICATIONS

Japanese search report for PCT/JP01/04960 dated Sep. 25, 2001.

(Continued)

*Primary Examiner*—Patrick Ryan
*Assistant Examiner*—Monique Wills
(74) *Attorney, Agent, or Firm*—RatnerPrestia

(57) ABSTRACT

A fuel cell electric power generating system is provided which does not occupy a large space, which requires a lower initial cost for equipment than the prior art, and of which the running cost is low. The system includes a reformer producing hydrogen-rich gas by utilizing a source gas, source gas supplying means of supplying the source gas to the reformer, air supplying means of supplying purging air to the reformer, and a fuel cell generating electric power by utilizing the hydrogen-rich gas produced at the reformer and air for electric power generation supplied from outside, wherein in stopping the operation of the fuel cell, the supply of the source gas to the reformer is stopped and the hydrogen-rich gas remaining within the fuel cell electric power generating system, steam and the purging air are passed in this order.

3 Claims, 4 Drawing Sheets

U.S. PATENT DOCUMENTS

| | | | |
|---|---|---|---|
| 5,178,969 A | | 1/1993 | Amemiya |
| 5,648,182 A | | 7/1997 | Hara et al. |
| 5,985,474 A | * | 11/1999 | Chen et al. .................... 429/17 |
| 2003/0087138 A1 | * | 5/2003 | Margiott et al. ............... 429/17 |

FOREIGN PATENT DOCUMENTS

| JP | 63-013277 | 1/1988 |
|---|---|---|
| JP | 03-257762 | 11/1991 |
| JP | 04-51469 | 2/1992 |
| JP | 11-111319 | 4/1999 |
| JP | 2972261 | 8/1999 |

OTHER PUBLICATIONS

English translation of Form PCT/ISA/210.

English Translation of International Search Report for PCT/JP01/04960, dated Sep. 25, 2001.

European Search Report for European Patent Application No. EP 01 93 8610, dated Aug. 24, 2004.

* cited by examiner

FUEL CELL ELECTRIC POWER GENERATING SYSTEM AND METHOD OF STOPPING FUEL CELL ELECTRIC POWER GENERATION

This Application is a U.S. National Phase Application of PCT International Application PCT/JP01/04960.

TECHNICAL FIELD

The present invention relates to fuel cell electric power generating systems.

BACKGROUND ART

A conventional fuel cell electric power generating system is of the configuration shown in FIG. 4 as described in Japanese Patent Laid-Open Gazette No. HEI3-257762. That is, such a system includes a reformer 1 of producing hydrogen-rich gas from a source gas, a burner 2a as heating means 2 of heating the reformer 1, nitrogen equipment 16 located upstream of and connected to the reformer 1 via a nitrogen supply pipe 14 and a shut-off valve 15, and a fuel cell 9 located downstream of and connected to the reformer 1 via a reformed gas supply pipe 17 for generating electric power by reacting oxygen contained in air with hydrogen produced, the downstream side of hydrogen electrode 9a of the fuel cell 9 being connected to the burner 2a via an exhaust hydrogen connecting pipe 12. It is to be noted that the entire disclosure of Patent Laid-Open Gazette No. HEI3-257762 is incorporated herein by reference in its entirety.

When the electric power generating operation of a general fuel cell electric power generating system is to be stopped, the supply of the source gas is stopped first. At this time the hydrogen-rich gas stays within the path of reformer 1~reformed gas supply pipe 17~hydrogen electrode 9a of fuel cell 9~exhaust hydrogen connecting pipe 12. In the event that air flows into this hydrogen-rich gas path due to natural convection from the burner 2a which is open to the atmosphere, there is a fear of explosion of hydrogen.

For this reason, as in this conventional fuel cell electric power generating system, it has been a practice to open the shut-off valve 15 to supply nitrogen as an inert gas from the nitrogen equipment 16 to the path of reformer 1~reformed gas supply pipe 17~hydrogen electrode 9a of fuel cell 9~exhaust hydrogen connecting pipe 12 via the nitrogen supply pipe 14 in stopping the electric power generating operation, thereby purging the hydrogen-rich gas completely and causing it to be burned by the burner 2a.

In this way the conventional fuel cell electric power generating system prevents explosion of hydrogen by the purging operation with nitrogen thereby to ensure safety.

Such a conventional fuel cell electric power generating system needs to have nitrogen equipment 16, such as a nitrogen cylinder, for the purging operation with nitrogen. In the case where such a system is used in a stationary-type dispersed power generation system for home use or a power source for electric vehicle, there arises a problem that the system requires a large space and an increased initial cost for equipment. There is another problem of an increased running cost because such a nitrogen cylinder needs to be periodically replaced or replenished.

DISCLOSURE OF INVENTION

In view of the foregoing problems essential to the prior art, it is an object of the present invention to provide a fuel cell electric power generating system which purges hydrogen-rich gas remaining in the fuel cell electric power generating system without using nitrogen gas after the electric power generation by a fuel cell has been stopped, as well as to provide a method of stopping fuel cell electric power generation.

One aspect of the present is a fuel cell electric power generating system comprising a reformer producing hydrogen-rich gas by utilizing a source gas, source gas supplying means of supplying said source gas to said reformer, first air supplying means of supplying purging air to said reformer, and a fuel cell generating electric power by utilizing the hydrogen-rich gas produced at the reformer and air for electric power generation supplied from outside, wherein first air supplying means of supplying purging air to said reformer, and a fuel cell generating electric power by utilizing the hydrogen-rich gas produced at the reformer and air for electric power generation supplied from outside, wherein in stopping the operation of said fuel cell, the supply of said source gas to said reformer is stopped and the hydrogen-rich gas remaining within the fuel cell electric power generating system, steam, and said purging air are passed in this order.

Another aspect of the present invention (corresponding to claim 2) is the fuel cell electric power generating, wherein when the supply of said source gas to said reformer is stopped, steam is supplied to said reformer or water is supplied to said reformer and heated to generate steam, and subsequently, after lapse of a predetermined time, said purging air is supplied to said reformer by said first air supplying means.

Still another aspect of the present invention is the fuel cell electric power generating system, wherein said predetermined time means a time taken for steam to purge the hydrogen-rich gas present within the fuel cell electric power generating system substantially completely.

Yet still another aspect of the present invention is the fuel cell electric power generating system, wherein said predetermined time means a time sufficient to provide a predetermined amount of steam between said hydrogen-rich gas and said purging air so as to avoid a dangerous state resulting from contact between said hydrogen-rich gas present within the fuel cell electric power generating system and said purging air.

Still yet another aspect of the present invention is the fuel cell electric power generating system, wherein said reformercomprises water supplying means of supplying water for producing hydrogen to said reformer and heating means of heating said reformer to turn said water for producing hydrogen into steam; and said reformer produces said hydrogen-rich gas by utilizing said steam also.

A further aspect of the present is the fuel cell electric power generating system, wherein steam is generated by heating said water for producing hydrogen even after the operation of the fuel cell is stopped.

A still further aspect of the present invention is the fuel cell electric power generating system, wherein said heating means use hydrogen off-gas exhausted from said fuel cell as a fuel.

A yet further aspect of the present invention is the fuel cell electric power generating system, wherein after steam reaches said heating means, the supply of said water for producing hydrogen to said reformer is stopped, while said purging air is supplied to said reformer.

A still yet further aspect of the present invention is the fuel cell electric power generating system, further comprising a carbon monoxide eliminator located downstream of said reformer for eliminating carbon monoxide contained in the hydrogen-rich gas produced at the reformer; and second air supplying means of supplying air for eliminating carbon monoxide to said carbon monoxide eliminator, wherein said fuel cell is supplied with hydrogen-rich gas from which carbon monoxide is already eliminated by said carbon monoxide eliminator.

An additional aspect of the present invention is the fuel cell electric power generating system, wherein said first air supplying means functions also as said second air supplying means and switching means is provided of switching a receiver of the supply of air from said first air supplying means to said reformer or said carbon monoxide eliminator.

A still additional aspect of the present invention is a method of stopping fuel cell electric power generation, which is employed after electric power generation performed using a reformer producing hydrogen-rich gas by utilizing a source gas, source gas supplying means of supplying said source gas to said reformer, first air supplying means of supplying purging air to said reformer, and a fuel cell generating electric power by utilizing the hydrogen-rich gas produced at the reformer and air for electric power generation supplied from outside, the method comprising, in stopping the operation of said fuel cell, stopping the supply of said source gas to said reformer and passing the hydrogen-rich gas remaining within a fuel cell electric power generating system, steam, and said purging air in this order.

A yet additional aspect of the present invention is the method of stopping fuel cell electric power generation, wherein when the supply of said source gas to said reformer is stopped, steam is supplied to said reformer or water is supplied to said reformer and heated to generate steam, and subsequently, after lapse of a predetermined time, said purging air is supplied to said reformer by said first air supplying means.

A still yet additional aspect of the present invention is the method of stopping fuel cell electric power generation, wherein said predetermined time means a time taken for steam to purge the hydrogen-rich gas present within the fuel cell electric power generating system substantially completely.

A supplementary aspect of the present invention is the method of stopping fuel cell electric power generation, wherein said predetermined time means a time sufficient to provide a predetermined amount of steam between said hydrogen-rich gas and said purging air so as to avoid a dangerous state resulting from contact between said hydrogen-rich gas present within the fuel cell electric power generating system and said purging air.

DESCRIPTION OF REFERENCE NUMERALS

Figure 1:
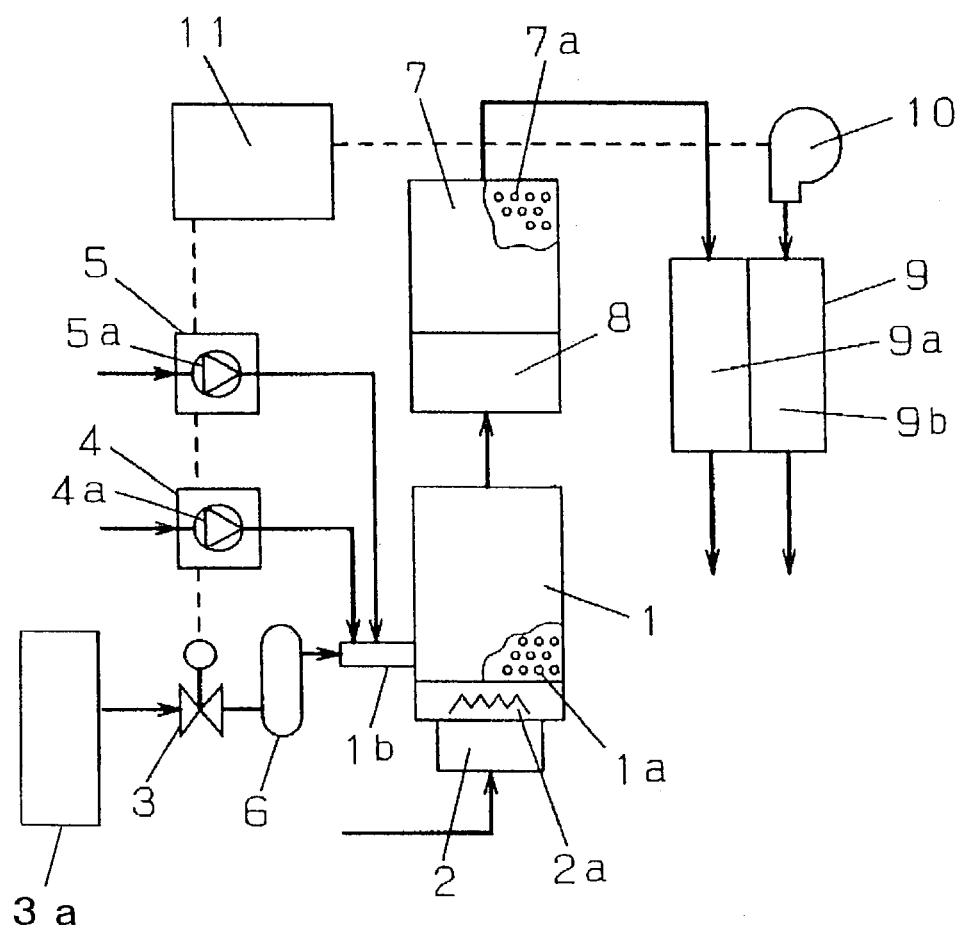
FIG. 1 is a diagram showing the system configuration of a fuel cell electric power generating system according to embodiment 1 of the present invention.

1 ... reformer
1b ... upstream
2 ... heating means
2a ... burner
4 ... water supplying means
5 ... air supplying means
7 ... carbon monoxide eliminator
9 ... fuel cell
11 ... control unit
13 ... switching means

BEST MODE FOR CARRYING OUT THE INVENTION

Hereinafter, embodiments of the present invention will be described with reference to the drawings.

Embodiment 1

FIG. 1 is a diagram showing the system configuration of a fuel cell electric power generating system according to embodiment 1 of the present invention. Reference numeral 1 designates a reformer filled therein with a reforming catalyst 1a for causing a reforming reaction to occur. The reformer 1 is provided with a burner 2a as heating means 2, and an upstream 1b inlet of the reformer 1 is equipped with a source gas supplying valve 3, a water pump 4a as water supplying means 4, and an air pump 5a as air supplying means 5, the pumps 4a and 5a being connected to the upstream 1b inlet so as to join with the upstream 1b. There may be case where a desulfurizer 6 for removing a sulfur content contained in a source gas is provided between the upstream 1b of the reformer 1 and the source gas supplying valve 3. Reference numeral 3a designates source gas supplying means of supplying the source gas to the reformer 1.

Reference numeral 7 designates a carbon monoxide eliminator connected to the downstream side of the reformer 1, the carbon monoxide eliminator 7 being filled therein with a catalyst 7a for causing a carbon monoxide eliminating reaction to occur. Between the reformer 1 and the carbon monoxide eliminator 7 may be provided a modifier 8 for lowering the carbon monoxide concentration to a certain degree by a modifying reaction. Reference numeral 9 designates a fuel cell connected to the downstream side of the carbon monoxide eliminator 7, the fuel cell 9 comprising a hydrogen electrode 9a and an oxygen electrode 9b, the oxygen electrode 9b being connected to a blower 10. Reference numeral 11 designates a control unit of controlling the operation of the system.

Next, the operation of embodiment 1 is described.

When the electric power generating operation is to be performed, the source gas supplying valve 3 is first opened to supply the source gas such as hydrocarbon to the reformer 1 from the upstream 1b of the reformer 1. Along therewith, water is supplied to the reformer 1 from the water supplying means 4. The source gas thus supplied is heated with the burner 2a when it passes through the reforming catalyst 1a, and water supplied to the reformer 1 is also heated with the burner 2a and turned into steam, so that a reforming reaction occurs between the source gas and steam to produce a hydrogen-rich gas. In this way, the reformer 1 in embodiment 1 produces the hydrogen-rich gas through the reforming reaction of the steam reforming system.

The hydrogen-rich gas generally contains carbon monoxide and, hence, the supply of the hydrogen-rich gas as it is to the fuel cell 9 causes the catalyst in the hydrogen electrode 9a to be poisoned thereby lowering the electric power generating ability. This tendency becomes noticeable particularly where the fuel cell is of the solid polymer type since the reaction temperature of this type of fuel cell is low. For this reason, the hydrogen-rich gas is fed to the carbon monoxide eliminator 7 to cause the gas to undergo a carbon monoxide eliminating reaction with the catalyst 7a contained therein and then supplied to the hydrogen electrode 9a of the fuel cell 9. On the other hand, the oxygen electrode 9b of the fuel cell 9 is supplied with air from the blower 10. In the fuel cell 9, hydrogen supplied to the hydrogen electrode 9a and oxygen contained in air supplied to the oxygen electrode 9b are allowed to react with each other thereby generating electric power. It should be noted that the hydrocarbon of a liquid fuel may be used instead of the source gas.

Next, description is made of the operation for stopping the electric power generating operation. First, the source gas supplying valve 3 is closed to stop supplying the source gas, while on the other hand, water supplied from the water pump 4a serving as the water supplying means 4 enters the inside of the reformer 1 where water is vaporized by heating with the burner 2a and resulting steam is passed through reformer 1~carbon monoxide eliminator 7~hydrogen electrode 9a of fuel cell 9 and then emitted to the outside. This operation purges residual hydrogen-rich gas.

After the hydrogen-rich gas remaining within the fuel cell electric power generating system at the time of the stoppage of electric power generation has been purged substantially completely by steam, the heating with the burner 2a and the water supply by the water pump 4a are stopped and then steam remaining within reformer 1~carbon monoxide eliminator 7~hydrogen electrode 9a of fuel cell 9 is purged by means of air supplied from the air pump 5a serving as the air supplying means 5.

Here, purge with air is not directly performed immediately after the stoppage of the electric power generating operation because it is possible that hydrogen is produced to an explosive concentration at the interface between the hydrogen-rich gas and air and explodes in the high-temperature atmosphere during its passage through the reformer 1. The second purge performed using air after the purge of the hydrogen-rich gas has been performed using steam intends to prevent water drops which are produced after cooled if residual steam stays within the system from affecting the system, for example corroding the inside of the path.

By the series of these operations performed by means of the control unit 11, there is no possibility that the hydrogen-rich gas remains within the path after the stoppage of the electric power generating operation and, hence, explosion of hydrogen can be prevented, thus ensuring safety.

While the embodiment described above supplies air to the reformer 1 from the air supplying means 5 after the hydrogen-rich gas remaining within the fuel cell electric power generating system at the time of the stoppage of electric power generation has been purged substantially completely by steam, in brief the embodiment is characterized that in stopping the operation of the fuel cell 9 the supply of the source gas to the reformer 1 is stopped and then the hydrogen-rich gas remaining within the fuel cell electric power generating system, steam and purging air are passed in this order.

In the embodiment described above, air is supplied to the reformer 1 from the air supplying means 5 after the hydrogen-rich gas remaining within the fuel cell electric power generating system at the time of the stoppage of electric power generation has been purged substantially completely by steam. However, even if the hydrogen-rich gas remains on the downstream side of the fuel cell electric power generating system, purging air may be supplied to the reformer 1 from the air supplying means 5 as long as the supply of purging air is performed after a predetermined amount of steam has been provided between the hydrogen-rich gas and the purging air so as to avoid a dangerous state resulting from contact between the remaining hydrogen-rich gas and the purging air from the air supplying means 5.

Though the embodiment described above obtains steam for purging the hydrogen-rich gas remaining within the fuel cell electric power generating system at the time of the stoppage of electric power generation by heating water supplied to the reformer 1, it is possible to supply steam to there former 1 and purge the hydrogen-rich gas by utilizing the steam.

Embodiment 2

Figure 2:
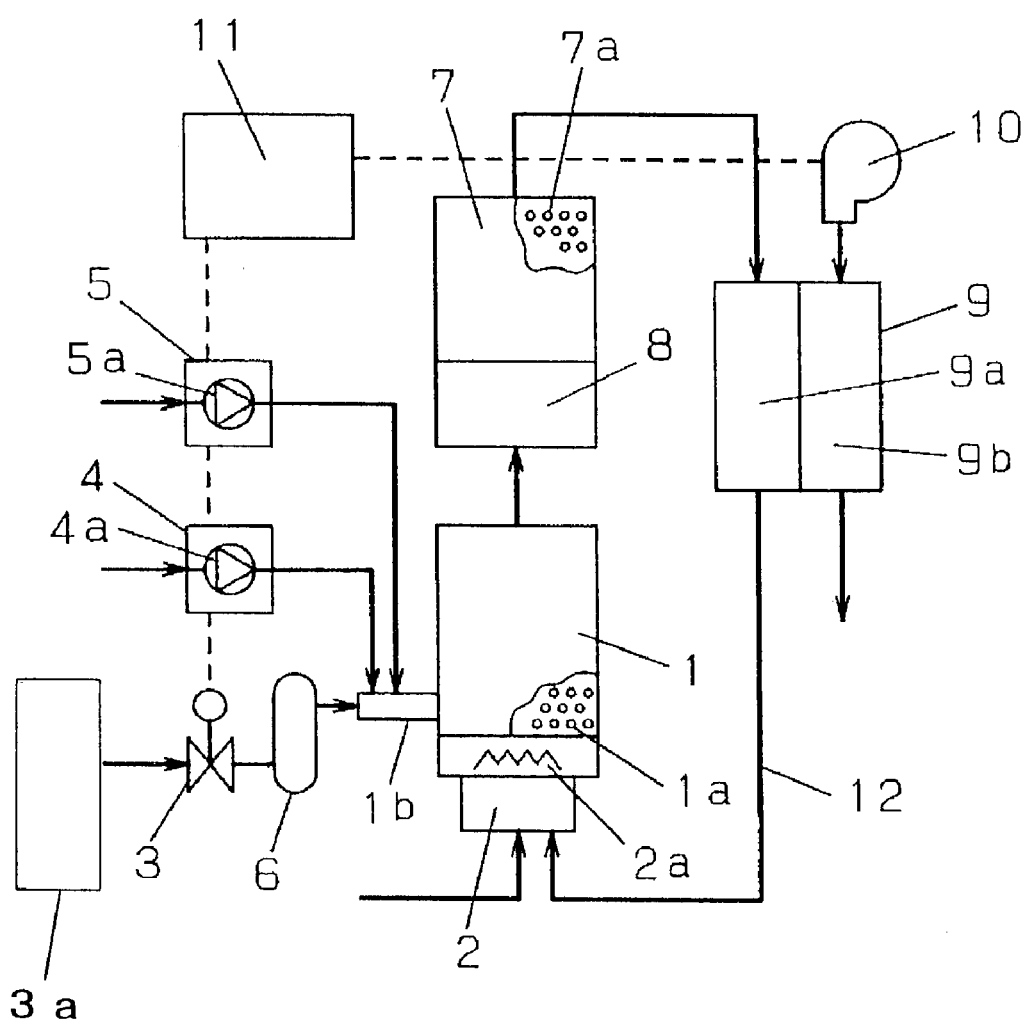
FIG. 2 is a diagram showing the system configuration of a fuel cell electric power generating system according to embodiment 2 of the present invention.

FIG. 2 is a diagram showing the system configuration of a fuel cell electric power generating system according to embodiment 2 of the present invention. Like reference numerals designate like parts throughout embodiments 1 and 2 for the purpose of omitting the descriptions thereof. Reference numeral 12 designates an exhaust hydrogen connecting pipe for supplying a hydrogen off-gas exhausted from the hydrogen electrode 9a of the fuel cell 9 to the burner 2a.

Next, the operation of embodiment 2 is described.

Though hydrogen is mostly consumed by the electric power generating reaction at the hydrogen electrode 9a of the fuel cell 9, a slight amount of hydrogen is exhausted as a hydrogen off-gas. By conducting the hydrogen off-gas to the burner 2a through the exhaust hydrogen connecting pipe 12 to use it as a fuel, the hydrogen off-gas is effectively utilized, while residual hydrogen is completely burned out without being emitted to the outside.

Though this embodiment 2 first purges the hydrogen-rich gas using steam at the time of the stoppage of the electric power generating operation like the embodiment 1, the embodiment 2 stops the water supply to the reformer 1 at the time the steam reaches the burner 2a and then purges the steam by means of air and, hence, hydrogen is completely burned out at the time of the stoppage of the water supply to the reformer 1, thus ensuring higher safety.

Though in each of the embodiments 1 and 2 described above the reformer 1 produces hydrogen-rich gas through the reforming reaction of the steam reforming system utilizing the source gas (hydrocarbon) and steam, the reformer 1 may be constructed to produce hydrogen-rich gas through a reforming reaction of the system which does not utilize steam, for example, the partial oxidation system.

Further, in each of the embodiments 1 and 2 described above, water is supplied to the reformer 1 from the water supplying means 4 in order to generate steam for reforming reaction with the source gas (hydrocarbon) as well as to generate steam for purging the hydrogen-rich gas after the stoppage of electric power generation. By doing so, it is possible to purge the hydrogen-rich gas without increasing the cost in the steam reforming system, thereby ensuring safety at a low cost. However, the water supply source for the generation of steam to be used in the reforming reaction and the water supply source for the generation of steam to be used to purge the hydrogen-rich gas may be provided separately from each other.

Embodiment 3

Figure 3:
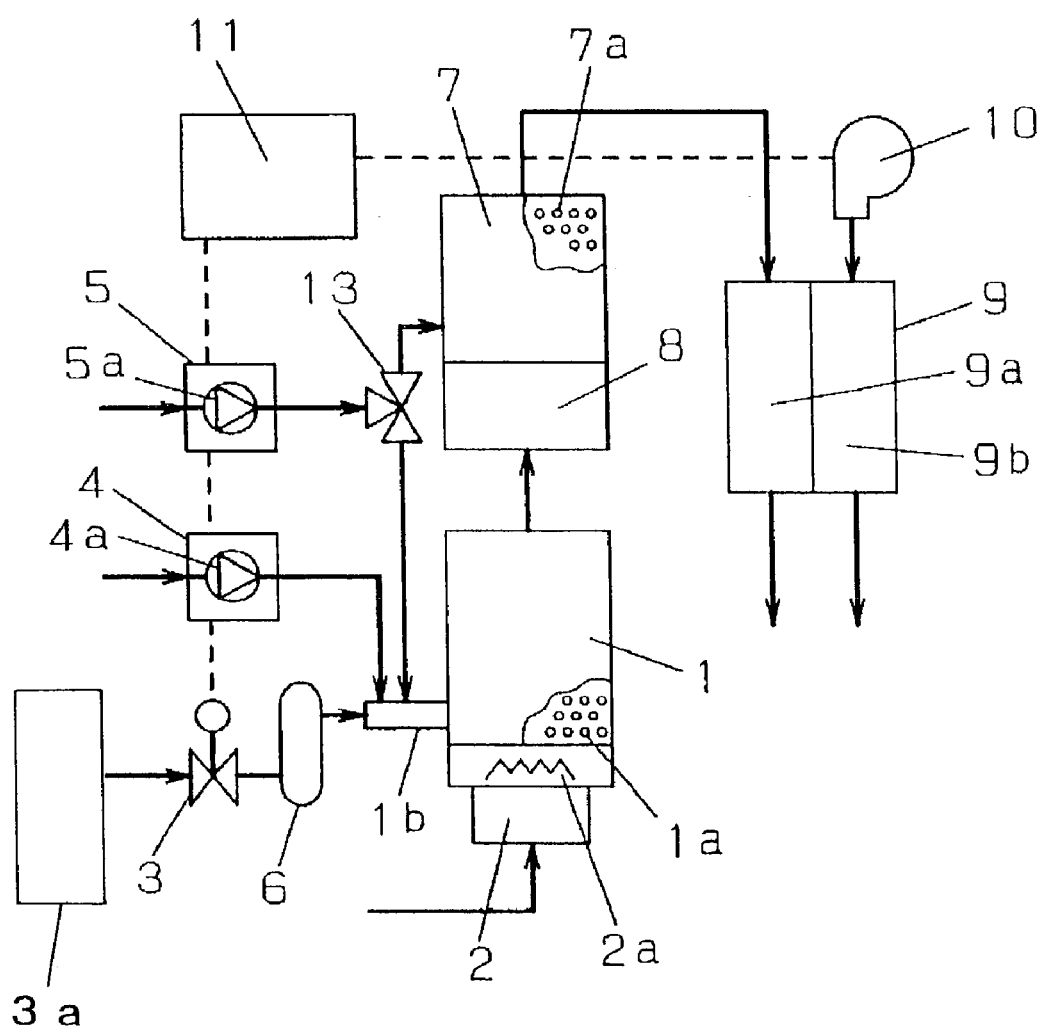
FIG. 3 is a diagram showing the system configuration of a fuel cell electric power generating system according to embodiment 3 of the present invention.
Figure 4:
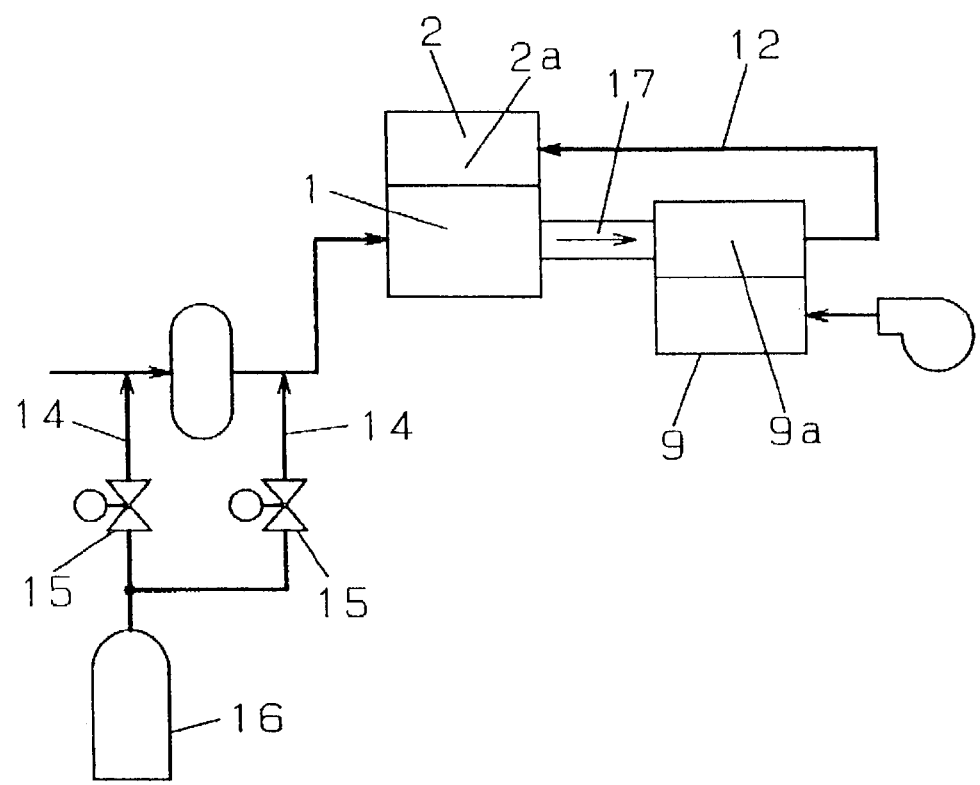
FIG. 4 is a diagram showing the system configuration of a conventional fuel cell electric power generating system.

FIG. 3 is a diagram showing the system configuration of a fuel cell electric power generating system according to embodiment 3 of the present invention. Like reference numerals designate like parts throughout embodiments 1 and 3 for the purpose of omitting the descriptions thereof. In the embodiment 3 the carbon monoxide eliminator 7 is of the selective oxidation system which allows carbon monoxide and air to react with each other selectively. The selective oxidation system, in general, requires the supply of air to the carbon monoxide eliminator 7. The air pump 5a as the air supplying means 5 also serves as an air supplying device for supplying air to the carbon monoxide eliminator 7. Switching means 13 appropriately switches air supply to the carbon monoxide eliminator 7 or to the upstream 1b of the reformer 1.

Next, the operation of embodiment 3 is described. Though the embodiment 3 supplies air for purging steam by means of the air pump 5a at the time of the stoppage of the electric power generating operation like the embodiment 1, the embodiment 3 utilizes the air pump 5a even during the electric power generating operation by switching the air supply therefrom to the carbon monoxide eliminator 7 by means of the switching means 13, thereby allowing the carbon monoxide eliminating reaction at the carbon monoxide eliminator 7 to proceed continuously.

As a result, it is possible to purge the hydrogen-rich gas and steam without increasing the cost in the selective oxidation system, thereby ensuring safety at a low cost.

Though the air pump 5a as the air supplying means 5 is used as the source for supplying air to the carbon monoxide eliminator 7 as well as the source for supplying air to the reformer 1 after the stoppage of electric power generation in the embodiment described above, the air supply source for the carbon monoxide eliminator 7 and the air supply source for the reformer 1 may be provided separately from each other.

As described above, any one of the embodiments of the present invention provides a fuel cell electric power generating system which does not permit hydrogen-rich gas to stay within the path after the stoppage of the electric power generating operation and hence prevents explosion of hydrogen, thereby ensuring safety. Since the fuel cell electric power generating system has a structure for purging the hydrogen-rich gas by means of steam, the system need not be provided with any nitrogen equipment, such as a nitrogen cylinder, which is needed by the prior art to perform the purging operation using nitrogen. In the case where the fuel cell electric power generation system according to the present invention is used in, for example, a stationary-type dispersed power generation system for home use or a power source for electric vehicle, it is possible to make the equipment compact and to decrease the initial cost. Further, since there is no need to replace or replenish such a nitrogen cylinder, it is also possible to decrease the running cost.

INDUSTRIAL APPLICABILITY

As apparent from the foregoing description, the present invention makes it possible to provide a fuel cell electric power generating system which purges a hydrogen-rich gas that remains in the fuel cell electric power generating system after the electric power generation performed by a fuel cell has been stopped without using nitrogen gas, as well as to provide a method of stopping fuel cell electric power generation.

The invention claimed is:

1. A method of stopping fuel cell electric power generation, which is employed after electric power generation performed using:
   a reformer producing hydrogen-rich gas by utilizing a source gas,
   a source gas supplying means of supplying said source gas to said reformer,
   a first air supplying means of supplying purging air to said reformer,
   a water supplying means of supplying water to the reformer in order to generate steam or a steam supplying means of supplying steam to said reformer; and
   a fuel cell generating electric power by utilizing the hydrogen-rich gas produced at the reformer and air for electric power generation supplied from outside,
   the method comprising the sequential steps of,
   stopping the supply of said source gas to said reformer when the operation of said fuel cell is to be stopped,
   supplying said steam to said reformer, based on the operation of said water supplying means or said steam supplying means, and
   supplying said purging air from said first air supplying means to said reformer after lapse of a predetermined time.

2. The method of stopping fuel cell electric power generation according to claim 1, wherein said predetermined time means a time taken for steam to purge the hydrogen-rich gas present within the fuel cell electric power generating system substantially completely.

3. The method of stopping fuel cell electric power generation according to claim 1, wherein said predetermined time means a time sufficient to provide a predetermined amount of steam between said hydrogen-rich gas and said purging air so as to avoid a dangerous state resulting from contact between said hydrogen-rich gas present within the fuel cell electric power generating system and said purging air.

* * * * *